United States Patent
Ng et al.

(10) Patent No.: US 8,755,136 B1
(45) Date of Patent: Jun. 17, 2014

(54) SYSTEMS AND METHODS FOR STORAGE DEVICE READ/WRITE HEAD MALFUNCTION DETECTION

(75) Inventors: Kian Wai Ng, Irvine, CA (US); Kameron K. Jung, Yorba Linda, CA (US); Jinghuan Chen, Irvine, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 99 days.

(21) Appl. No.: 13/450,290

(22) Filed: Apr. 18, 2012

(51) Int. Cl.
  *G11B 27/36* (2006.01)
(52) U.S. Cl.
  USPC .................. 360/31; 360/53; 360/55; 360/67
(58) Field of Classification Search
  None
  See application file for complete search history.

(56) References Cited

U.S. PATENT DOCUMENTS

| | | | |
|---|---|---|---|
| 6,556,933 B1 | 4/2003 | Sacks et al. | |
| 7,062,698 B2 | 6/2006 | Yang | |
| 7,092,195 B1 | 8/2006 | Liu et al. | |
| 7,158,325 B1 | 1/2007 | Hu et al. | |
| 7,180,692 B1 | 2/2007 | Che et al. | |
| 7,184,230 B1 | 2/2007 | Chue et al. | |
| 7,215,495 B1 | 5/2007 | Che et al. | |
| 7,365,931 B2 | 4/2008 | Ikai et al. | |
| 7,423,830 B2 | 9/2008 | Ma et al. | |
| 7,436,620 B1 | 10/2008 | Kang et al. | |
| 7,440,220 B1 | 10/2008 | Kang et al. | |
| 7,457,073 B2 | 11/2008 | Kurita et al. | |
| 7,796,483 B2* | 9/2010 | Kikukawa et al. | 369/47.5 |
| 7,974,039 B1 | 7/2011 | Xu et al. | |
| 2003/0065992 A1 | 4/2003 | Yang | |
| 2007/0230002 A1 | 10/2007 | Kassab | |
| 2007/0230015 A1 | 10/2007 | Yamashita et al. | |
| 2007/0291401 A1 | 12/2007 | Sun et al. | |
| 2008/0158704 A1 | 7/2008 | Knigge et al. | |
| 2008/0165444 A1 | 7/2008 | Zafer | |
| 2008/0239581 A1 | 10/2008 | Ikai et al. | |
| 2009/0268330 A1 | 10/2009 | Lee et al. | |

OTHER PUBLICATIONS

Canchi, et al., "Experimental Investigation of Thermal Fly-height Control (TFC) Slider Dynamics Under Contact", INSIC 2008 Annual Meeting, Dec. 11, 2008, Milpitas, California, 23 pages.

* cited by examiner

*Primary Examiner* — Muhammad N Edun (57) ABSTRACT

In various embodiments, systems and methods to detect signal irregularity caused by defects in the read/write head element are disclosed. In some embodiments, an exemplary system comprises a memory and a processor. The processor is coupled to the memory and is configured to implement a filter module and a detector module. The filter module is configured to generate a test waveform based on data read from a medium by a storage device head to be tested. The detector module is configured to generate a signal quality value based on a property of at least a portion of the test waveform, compare the signal quality value to an event threshold, and generate an event indicator based on the comparison, the event indicator indicating possible instability of the storage device head.

44 Claims, 7 Drawing Sheets

FIG. 1

FIG. 2 Read Back Waveform From A Good Head

SYSTEMS AND METHODS FOR STORAGE DEVICE READ/WRITE HEAD MALFUNCTION DETECTION

BACKGROUND

1. Field

The present invention generally relates to detecting a malfunctioning storage device. More particularly, the invention relates to systems and methods for storage device read/write head malfunction detection.

2. Description of Related Art

Contemporary storage solutions often rely on hard disk drives (HDDs) for data storage and retrieval. If one or more read/write heads of an HDD are defective or otherwise have irregularities, however, errors may appear in data written to and/or data read from the HDD media. Unfortunately, many of these errors are detected once the HDD has already been put to use (e.g., as a part of a storage farm).

In contemporary HDD manufacturing, one or more read/write heads of the HDD many come from external and/or different sources. An instable read/write head may be caused by a bad wafer during manufacture of the head or degradation in the head over time. Further, the process of shipping or moving the read/write heads to the HDD manufacturing site may further damage the read/write heads.

Unfortunately, an irregularity in just one read/write head may lead to inconsistent performance of the HDD. Since the poor HDD performance may not be consistent, it may be difficult to repeat or isolate errors associated with a bad wafer in a read/write head. Moreover, one or more instable read/write heads may lead to loss of reliability and data integrity that increases with time.

DETAILED DESCRIPTION

In order to avoid inconsistent performance caused by malfunctioning or instable read/write heads of a storage device, the read/write heads may be screened. In some embodiments, prior to shipping and/or use by a customer, in a backend process or a drive level self test for example, one or more read/write heads of a storage device may be tested.

In one example of read/write head screening, a consistent data pattern may be written to storage media contained within a storage device (e.g., HDD). The read/write head(s) to be tested may then read the data pattern from the storage device. The data pattern and/or waveforms associated with the data retrieved from the storage media should be representative of the data pattern that was initially written to the storage media.

In various embodiments, portions of the data pattern read from the storage media may be identified and compared to an expected output (i.e., threshold) to determine if there is evidence of malfunction or instability. For example, the data pattern read from the storage media may be portioned into segments. Each segment may then be filtered to better characterize the segment. For example, the segment may be filtered to determine the average amplitude of the segment. The filtered segment may then be compared to an expected output (e.g., the average amplitude of the segment may be compared to an expected average amplitude) to determine if there is evidence of malfunction (e.g., the average amplitude of the segment is at a significant variance when compared to the expected average amplitude).

Evidence of malfunction based on the comparison may be aggregated over many segments and compared to a threshold to determine an overall performance of one or more read/write heads. As a result of this screening, inconsistent performance may be used to detect malfunctioning or instable read/write heads while reducing or eliminating false positives.

Figure 1:
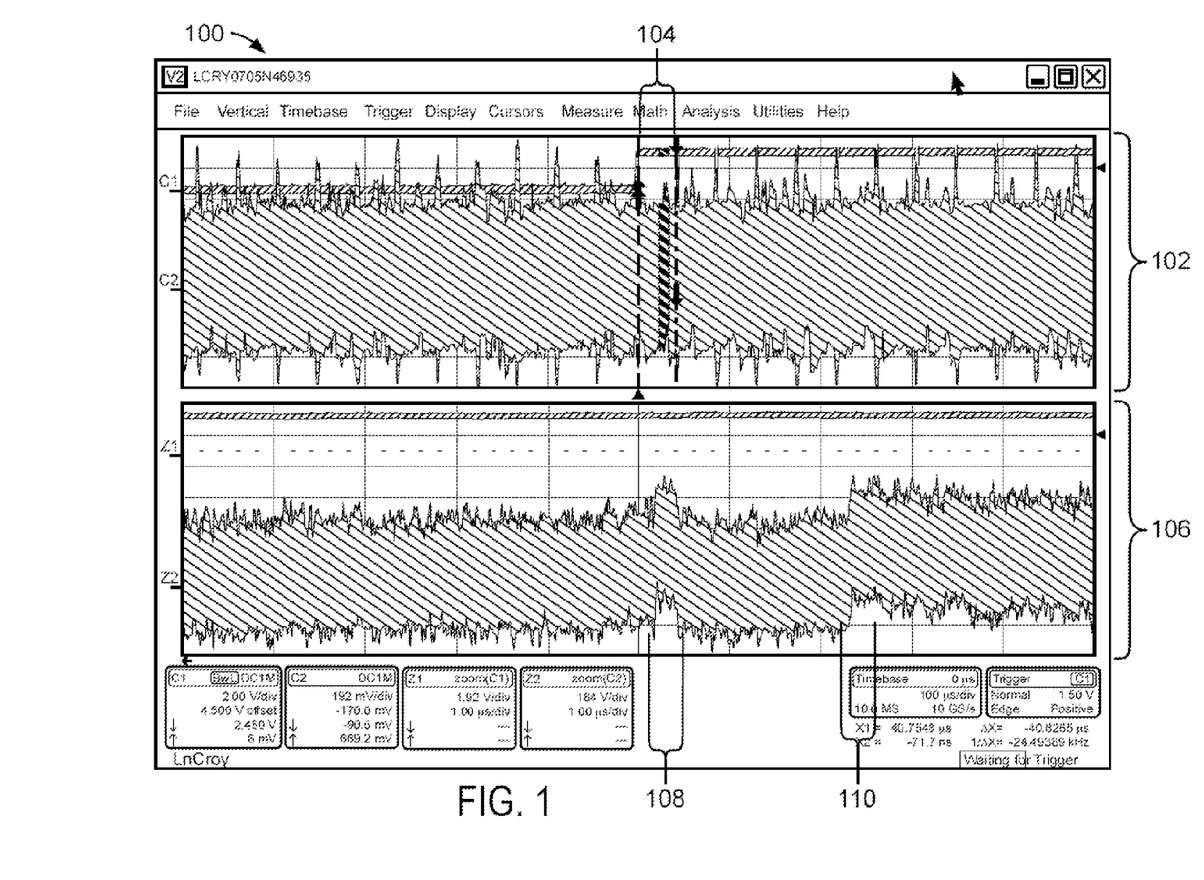
FIG. 1 depicts a graph including read-back waveforms which may indicate an instable read/write head in some embodiments.

FIG. 1 depicts a graph 100 including read-back waveforms 102 and 106 which may indicate an instable read/write head in some embodiments. In various embodiments, one or more storage device read/write heads to be screened may attempt to write a known and/or consistent data pattern to a storage media. During read-back, the resulting waveform from the storage read/write head(s) in question should reflect an expected and/or consistent data pattern. Read-back waveform 102 depicts a portion of a waveform that has been received from one or more storage read/write head(s) that are being screened. In one example of a consistent data pattern being written to the storage media, if the storage read/write head(s) are working as expected, the read-back waveform 102 should be similarly consistent (e.g., without pops or significant shifts).

A subsection 104 of waveform 102 depicts a potential inconsistency. Waveform 106 represents a magnified view of subsection 104. Upon review of waveform 106, it appears that there are at least two inconsistent portions of the waveform. In particular, portions 108 and 110 represent a shift in or baseline-pop (BLP) of the waveform. Since the data pattern that was written to the storage media should be devoid of shifts and/or BLP, such changes in the waveform may indicate that one or more of the storage device read/write heads are instable.

In an example of a read/write head screening process, a consistent pattern and/or known pattern of data may be written to computer readable media (e.g., a hard disk drive media). The data may then be subsequently read from the media by the read/write heads to be screened and waveforms, such as waveform 102, may be inspected for errors. Errors may be identified or detected by scanning waveforms or subsections of waveforms for inconsistencies. In some embodiments, error may be identified or detected by comparing all or subsections of the data read back from the media to expected data (e.g., comparing the waveform 102 or a portion of the waveform 104 to an expected waveform or threshold).

In the subsection of waveform 104 depicted in waveform 106, two errors or events may be identified. Portion 108 and portion 110 show a decided shift or baseline pop. These shifts in the waveform 106 may be indicative a bad or instable head. In some embodiments, any change within the waveform 106 and or waveform 102 may be indicative of a bad or instable head. For example, if constant and consistent test data is written to and read from the media using the same head, shifts in the waveform may indicate errors.

In various embodiments, errors or indications of poor performance may be detected based on a comparison of all or a subsection of waveforms to an expected result or expected waveform. Significant differences between the waveform and the expected outcome may indicate a malfunction or instability. In some embodiments, one or more read/write heads may not be determined as malfunctioning or inconsistent unless there are more than a predetermined number of errors. Those skilled in the art will appreciate that there may be many ways in which a waveform may be used to indicate a good or otherwise malfunctioning head.

Figure 2:
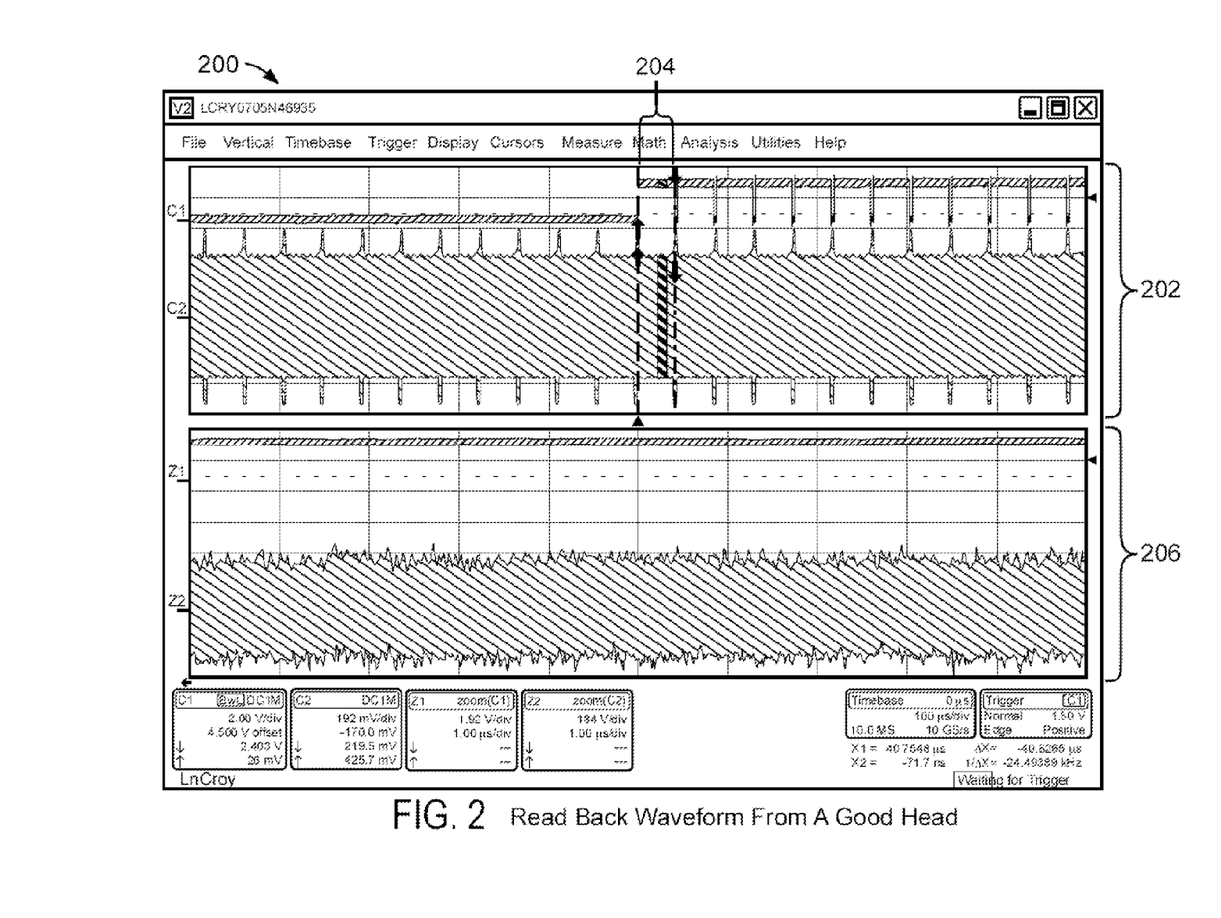
FIG. 2 depicts a graph including read-back waveforms which may indicate a good read/write head in some embodiments.

FIG. 2 depicts a graph 200 including read-back waveforms 202 and 206 which may indicate a good read/write head in some embodiments. Similar the process described regarding FIG. 1, a consistent test pattern may be written to storage media utilizing one or more read/write heads to be screened. Read-back waveform 202 depicts a portion of a waveform that has been received from one or more storage read/write head(s) that are being screened. In one example of a consistent data pattern being written to the storage media, if the storage read/write head(s) are working as expected, the waveform 202 should be similarly consistent (e.g., without pops or significant shifts). In this example, the waveform 202 appears to be consistent.

Subsections of the waveform 202 may also be analyzed for consistency and/or similarity to an expected output. Waveform 204 is a subsection of the waveform 202. Upon closer review of waveform 204, represented in a magnified view by waveform 206, it appears that that are no significant shifts or pops. In some embodiments, subsections of the waveform 202 may be identified and each subsection may be scanned and/or compared to an expected result or threshold. If the subsections of the waveform 202 meet expectations or one or more properties associated with the waveform (e.g., amplitude) are substantially similar to expected results (e.g., below the threshold), the read/write head(s) may be determined to be stable or, alternately, not instable.

Figure 3:
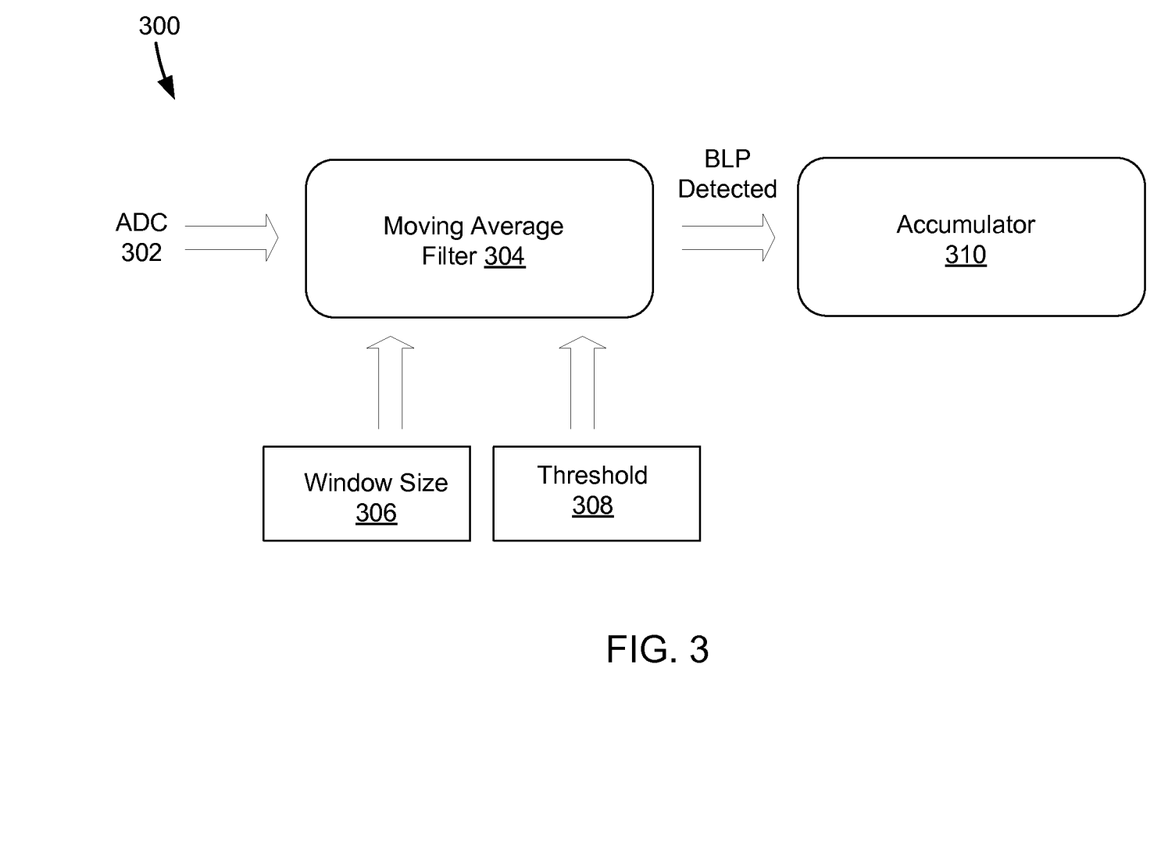
FIG. 3 depicts a block diagram of an exemplary process for screening a read/write head in some embodiments.

FIG. 3 depicts a block diagram 300 of an exemplary process for screening a read/write head in some embodiments. Generally, detection of signal irregularity caused by defects in the read/write head element may take place after a head signal has been sampled into digital form. In some embodiments, the read/write head to be tested reads data from a storage media and a signal from the read/write head is sampled into digital form through an analog-to-digital converter (ADC). For example, in some embodiments, the read back signal from the read head may be sampled in a read channel of a hard disk drive. A good read/write head may reproduce what was written before keeping the signal integrity. If, however, the read/write head has any inherent deformity, the outcome of read-back signal may be altered.

The signal from the ADC may be compared to an expected signal (e.g., a signal representative of the data sampled from the known pattern and/or written by a known good read/write head). In various embodiments, analog and digital filters of a read channel are calibrated such that the irregularity in the signal is preserved. Subsequently, an existing defect scan circuit may allow the digital samples to be post-processed through a moving average filter as described herein. With careful optimization of a window size and a threshold selection of the filter, the signal irregularity may be detected and captured.

A windows size is a portion of a sampled signal that may be scanned or reviewed for events or indications of a bad read/write head. A threshold is a predetermined limit which when exceeded may indicate an event or indication of a bad read/write head. In some embodiments, if a subsection or portion of the signal of the window is above the threshold, there may be evidence of an event or indication of similar head instability.

An aggregate indicator may accumulate or otherwise aggregate the number of indications of head instability. As such the aggregate indicator may track the events or indications of head instability. A quantity of the accumulated events (e.g., shifts beyond the limit established by the threshold) may indicate the severity of the instability of the read/write head.

In some embodiments, the exemplary process comprises reading data with a read/write head to be screened. The data may be read from any storage device or storage media. A storage device is any device configured to store or retrieve data utilizing a read/write head including, for example, an HDD. Storage media may be any memory including, but not limited to, hard disk media, optical memory, or the like. Once data is read by one or more read/write heads to be screened, an analog-to-digital converter (ADC) 302 may convert the data to digital data. The digital data may then be processed to detect a BLP or other event that may be representative of an instable read/write head.

The digital data from the ADC 302 may then be processed by a moving average filter 304. The moving average filter assists in detecting BLP or other events representative of an instable read/write head. In some embodiments, the moving average filter is a moving average of a subsection of the waveform read back by the tested head. Those skilled in the art will appreciate that the moving average filter may perform any statistical or mathematical function to better describe, characterize, or summarize the waveform. The size of the subsection of the waveform may be predetermined (e.g., based on the window size 306).

For example, once a subsection of the waveform is identified, the subsection may be averaged and compared to a predetermined threshold 308. If the average of the subsection is outside the predetermined threshold 308, a BLP or event is identified. In one example, a portion of the waveform read with the head may be averaged (e.g. the amplitude of the waveform and/or voltage of the signal). If the average is greater than the threshold, then an event may be detected. An event may indicate that the head is instable. In one example, occasional spikes in amplitude or short shifts in the waveform may not be a significant indicator that the head is malfunctioning or that the problem is severe. By averaging a portion of the read-back waveform from the head being tested, spikes or short shifts may be "averaged out" or otherwise identified as insignificant. If, alternately, a larger subsection of the waveform has indicates a change in amplitude or a shift, the moving average may be greater than the threshold.

The accumulator 310 may then count the number of events (e.g., averages of subsections that exceed or are outside an expected variance of the threshold). If the number of events is greater than an instability threshold, then the read/write head (s) may be determined to be instable.

Based on a severity of a malfunction or instability of one or more read/write heads, corrective or mitigating actions may be taken. For example, in order to increase the output amplitude of a poor functioning read/write head, the spacing between read/write head and media may be adjusted. In another example, a voltage may be biased across the read/write head. Adjustments to spacing or the bias voltage may be necessary because some BLP may only start to happen when a certain signal magnitude is reached (again due to defect properties). Those skilled in the art will appreciate that the spacing between the head and media and/or increasing a bias of voltage may increase an output amplitude. In some embodiments, if the detected instability is sufficiently significant, the malfunctioning read/write head may be removed or is unused. In various embodiments, the capacity of the storage device with the instable read/write head may be reduced in order to reduce stress on the instable read/write head. Those skilled in the art will appreciate that many different corrective and/or mitigating actions may be taken based on the read/write head screening.

Figure 4:
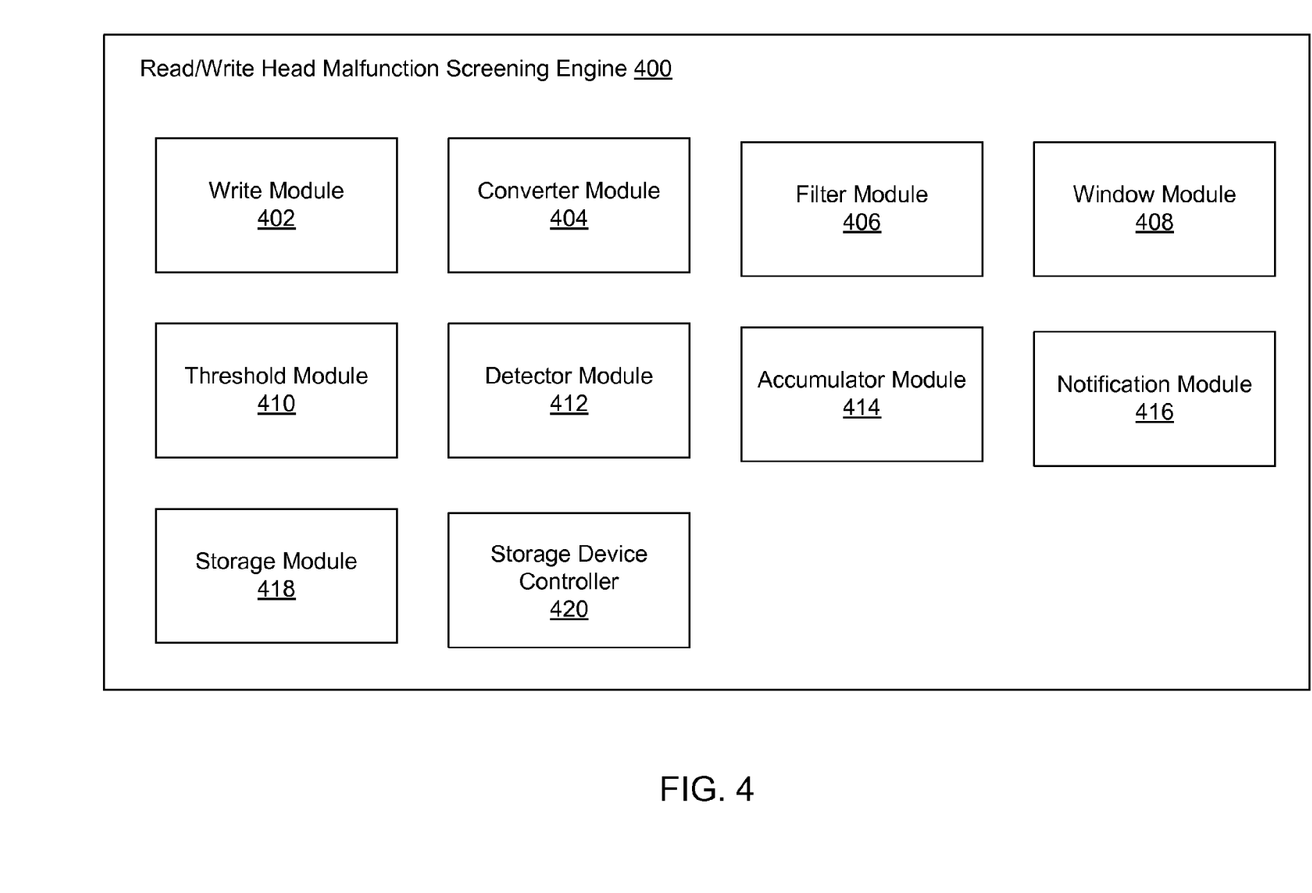
FIG. 4 is a box diagram of the read/write head malfunction screening engine in some embodiments.

FIG. 4 is a box diagram of the read/write head malfunction screening engine 400 in some embodiments. The read/write head malfunction screening engine 400 comprises a write module 402, converter module 404, a filter module 406, a window module 408, a threshold module 410, a detector module 412, an accumulator module 414, a notification module 416, a storage module 418, and a storage device controller 420. The read/write head malfunction screening engine 400 is configured to screen and/or otherwise test one or more read/write heads of a storage device such as a hard disk drive. The read/write head malfunction screening engine 400 may be a part of a digital device that tests read/write heads, may be a part of a controller of a storage device (in which case storage device controller 420 would not be part of the engine 400), or any other device. In one example, the read/write head malfunction screening engine 400 is within or otherwise controlled by a computer to test one or more read/write heads, either in parallel or serial, of any number of storage devices. In another example, the read/write head malfunction screening engine 400 may be integrated into an onboard controller of a storage device. Those skilled in the art will appreciate that the read/write head malfunction screening engine 400 may be located on any device. In some embodiments, some modules may be omitted, combined together into fewer modules, or divided into more modules.

The read/write head malfunction screening engine 400 and/or the modules of the read/write head malfunction screening engine 400 may comprise hardware, software, or a combination of both hardware and software. In one example, one or more of the modules of the read/write head malfunction screening engine 400 may be loaded into memory, such as RAM, and executed by a processor. In another example, one or more of the modules may be implemented in hardware and/or firmware (e.g., in a processor such as System on Chip (SOC)).

The optional write module 402 may be configured to write known data, a known pattern, or an expected pattern to the storage media. The data and/or pattern written to the storage media may be written using the read/write head(s) to be screened or written to the storage media by any other head. A known or expected pattern that is written to the storage media may increase the effectiveness and sensitiveness of read/write head malfunction detection because of the degree of severity in the read/write head element may have on the read-back signal. In one example, a single tone frequency ¼ of the operating data rate (i.e., the 2T frequency) may be effective. Those skilled in the art will appreciate that any pattern may be used.

The converter module 404 may be configured to receive and convert data read from the storage device media by the read/write head to be tested. In various embodiments, the converter module 404 comprises an analog-to-digital converter configured to convert the data read from the storage device media from an analog signal to a digital signal. In some embodiments, the converter module 404 may convert the data received from the storage device media to any format or type of signal. Those skilled in the art will appreciate that the converter module 404 may be optional.

The filter module 406 may section and/or filter the waveform from the converter module 404 to identify a signal quality value based on one or more properties of the waveform. In some embodiments, the filter module 406 identifies portions or subsections of the waveform. The portion or subsections of the waveform may be based on a predetermined window size from the window module 408 described herein. In one example, a waveform based on the information read by one or more read/write heads may be divided into subsections based on the predetermined window size. The subsections may all be of equal size. In some embodiments, one or more of the subsections are not of a size equal to the predetermined window size and/or other subsections of the waveform. In various embodiments, the waveform may be divided into subsections of different lengths. Those skilled in the art will appreciate that there are many ways to portion or divide the waveform.

In some embodiments, the filter module 404 filters the waveform subsections or portions to assist in identifying indicia or evidence of malfunction or instability. In one example, the filter module 404 averages or performs other statistical methods utilizing one or more properties of the waveform. A property of the waveform may be any characteristic of the waveform including, but not limited to, amplitude, signal strength, voltage, frequency, phase, or the like. In one example, the filter module 404 may average amplitude across the waveform subsection or portion. Those skilled in the art will appreciate that the filter module 404 may perform any number of statistical or mathematical processes utilizing any number of properties of the waveform.

In another example, the filter module 406 may be configured to determine a moving window average of the waveform read-back by the tested head. In various embodiments, a portion of the waveform read with the tested read/write head may be averaged (e.g. the amplitude of the waveform and/or voltage of the signal). If the average is greater than a predetermined threshold, then an event may be detected. An event may indicate or otherwise be evidence that the read/write head being tested is instable. In one example, occasional spikes in amplitude or short shifts in the waveform may not be a significant indicator that the read/write head is malfunctioning. By averaging a subsection or portion of the read-back waveform from the head being tested, spikes or short shifts may be "averaged out" or otherwise treated as insignificant. If, alternately, a larger portion of the waveform has indicates a change in amplitude or a shift, the moving average may be greater than the threshold.

The window module 408 may provide the filter module 406 with the predetermined window size. The predetermined window size may be provided by a manufacturer or operator. In some embodiments, a data store may comprise a plurality of different predetermined window sizes. A processor or module may select a predetermined window size from the plurality based on the manufacturer of the read/write head, manufacturer of the storage device, firmware author, performance characteristics of the read/write head, performance characteristics of the storage device, specifications of the storage device, and/or other factors.

The threshold module 410 may provide the filter module 406 with the predetermined threshold. The predetermined threshold may be provided by a manufacturer or operator. In some embodiments, a data store may comprise a plurality of different predetermined thresholds. A processor or module may select a predetermined threshold from the plurality based on the manufacturer of the read/write head, manufacturer of the storage device, firmware author, performance characteristics of the read/write head, performance characteristics of the storage device, specifications of the storage device, density of data stored in the storage media of the storage device, and/or other factors. Similar or different characteristics may be used to select the predetermined window size and the predetermined threshold.

The detector module 412 may compare or otherwise assess the signal quality value (e.g., identifying indicia or evidence of malfunction or instability) produced by the filter module 406 in view of the predetermined threshold (i.e., the event threshold) to identify an event. An event indicator may indicate that the subsection of the waveform processed by the filter module 406 is not sufficiently similar to an expected waveform. As such, the event indicator may be evidence that the read/write head may be instable. Those skilled in the art will appreciate that a few errors in the overall performance of the read/write head may be insufficient to perform corrective action. However, performance that is consistently poor or otherwise sufficiently severe may require corrective measures.

The accumulator module 414 may track the number of event indicators over a predetermined range (e.g., predetermined period of time, data rate, and/or amount of data). If the number of event indicators over the predetermined range exceeds an instability threshold, then one or more read/write heads being tested may be considered to be instable or malfunctioning. Further, the greater the difference between the number of event indicators and the instability threshold, the more likely that the detected malfunction of the read/write head may be perceived as being severe.

The notification module 416 may notify a user or a digital device if one or more read/write heads being tested either pass or whether the number of event indicators over the predetermined range exceeds the instability threshold. In various embodiments, there may be any number of thresholds indicating greater degrees of severity. Corrective measures may be based, at least in part, on the degree of severity. For example, based on the degree of severity, the read/write head may not be used, the read/write head may be used only for reading and not writing, the read/write head may be used for writing and not reading, or the amount of data that the read/write head may be expected to write and/or read over time may be reduced (e.g., reduce an expected rate of data throughput or bandwidth). Those skilled in the art will appreciate that many different corrective measures may be taken to correct, mitigate, or replace one or more read/write heads.

The storage module 418 may comprise the storage media being written to and read from by the read/write heads being tested. In some embodiments, the storage module 418 comprises instructions for the modules and/or a processor to assist or control functionality described herein.

The storage device controller 420 may be configured to control one or more storage devices, write data and/or patterns to storage media of one or more storage devices, test the read/write head(s), coordinate testing between multiple read/write heads and/or multiple storage devices, or the like.

Figure 5:
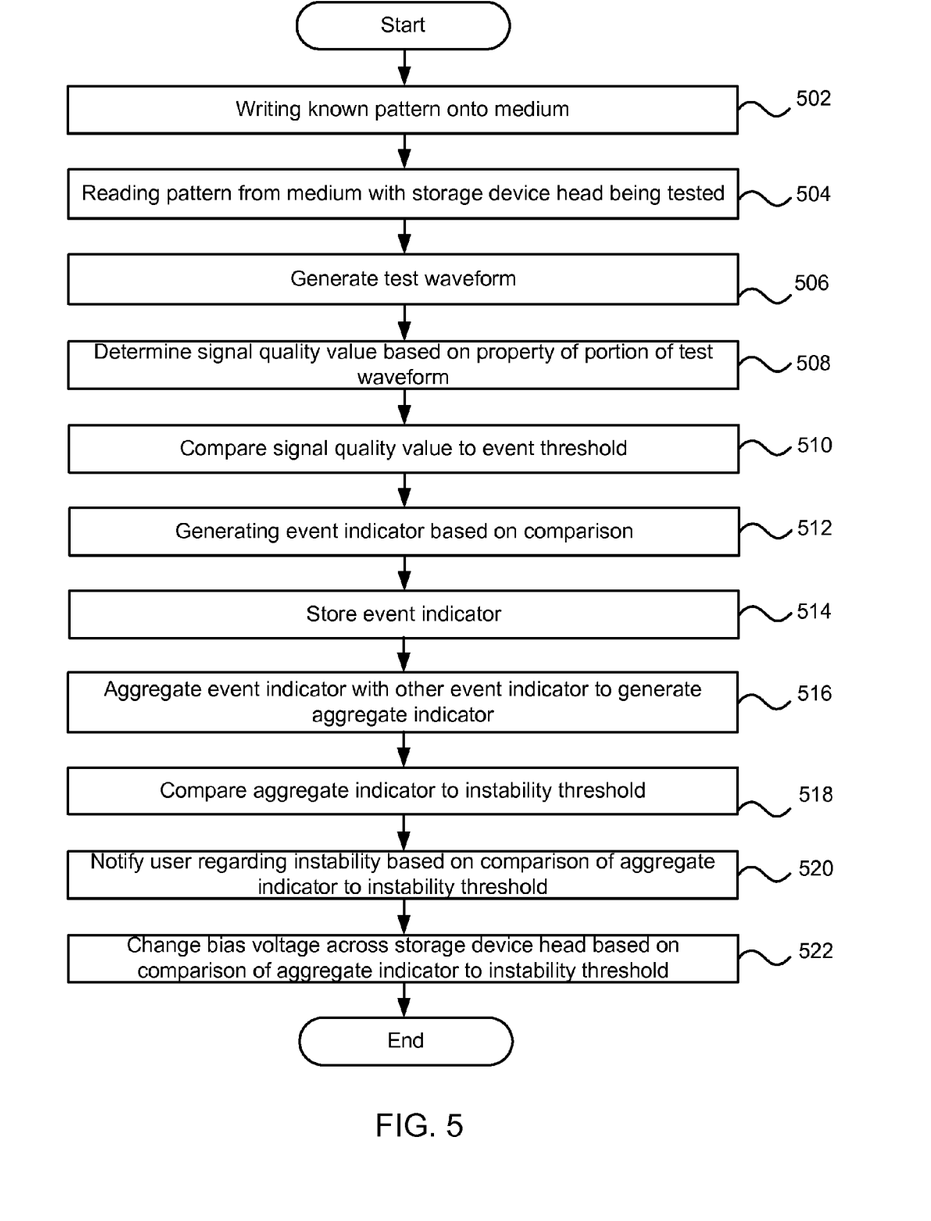
FIG. 5 is a flow chart for screening one or more read/write heads in some embodiments.

FIG. 5 is a flow chart for screening one or more read/write heads in some embodiments. In block 502, the write module 402 writes a known pattern onto the storage medium. In various embodiments, any device may write the pattern onto the storage medium. The known pattern may be predetermined data or represent data that will generate an expected waveform. In some embodiments, one or more read/write heads may be placed under stress during screening. For example, a write current may be increased or decreased for one or more of the read/write heads that write the predetermined pattern. The effect of increasing or decreasing the write current at the time of writing the predetermined pattern may induce domain instability in the read head. These changes may be subsequently identified as evidence of instability and/or malfunction.

In block 504, the read/write head(s) to be screened read the known pattern from the storage medium. In some embodiments, a single read/write head reads the data on the storage medium that was initially written by the write module 402. In various embodiments, a read/write head may be purposely stressed to induce instability during read-back. For example, stress may be induced by adjusting a fly height of the read/write head(s) to be tested, by generating heat at or near the read/write head to be tested, and/or adjusting the bias voltage across the read/write heads. As discussed herein, these changes may affect the read-back of the data from the storage medium. These changes may be subsequently identified as evidence of instability and/or malfunction.

In block 506, the converter module 404 may generate a test waveform based on the data that is read by the read/write head(s). In one example, one or more ADCs may sample and convert data from a read channel. Those skilled in the art will appreciate that a waveform may not be created, rather, the data or properties of the data (e.g., errors) from the read-back may be otherwise compared to expected results or a predetermined threshold to identify events that may suggest that the read/write head(s) are instable.

In block 508, the detector module 412 and/or the filter module 406 determine a signal quality value based on a property of at least a subsection of the test waveform. In some embodiments, the filter module 406 may identify subsections of the data or waveform read-back by the read/write head(s). The subsections may then be assessed. For example, a signal quality value may be generated for each subset. The signal quality value may be based on a property of the subset, such as voltage or amplitude. In one example, the signal quality value is an average of the amplitude throughout a subsection of the waveform.

In block 510, the detector module 412 compares or otherwise associates the signal quality value to an event threshold (i.e., predetermined threshold) to determine if a fault or event is indicated. In block 512, the detector module 412 may generate an event indicator based on the comparison or association. For example, if the signal quality value is not expected or insufficiently similar to an expected range, the detector module 412 may generate the event indicator.

In block 514, the event indicator may be optionally stored within the storage module 418 or any other data storage. In block 516, the accumulator module 414 aggregates or otherwise accumulates the event indicator with other event indicators associated with other subsections of the waveform to generate the aggregate indicator. The aggregate indicator may represent one or more values that may indicate a degree of severity, if any, of one or more malfunctioning or instable read/write heads.

In block 518, the accumulator module 414 or the notification module 416 may compare or otherwise associate the aggregate indicator with the instability threshold. If the aggregate indicator exceeds or is otherwise in sufficient variance of the instability threshold, then the notification module 416 may notify a user or digital device that the one or more read/write heads are malfunctioning and/or sufficiently instable as to lead to poor performance.

In block 522, corrective action may be taken. For example, the storage device controller 420 or other module may bias voltage across the read/write head to improve performance. Those skilled in the art will appreciate that many different corrective or mitigating actions may be taken. Although various example modules are described as performing activities in the various blocks in FIG. 5, in some embodiments, the activities can be performed by more modules, fewer modules, or different modules than indicated.

Figure 6A:
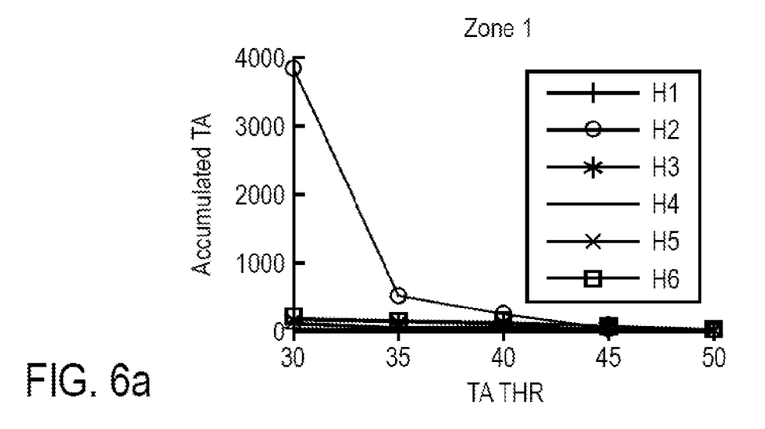
FIG. 6a depicts a graph of zone 1 indicating the accumulated events detected with six different read/write heads in some embodiments.
Figure 6B:
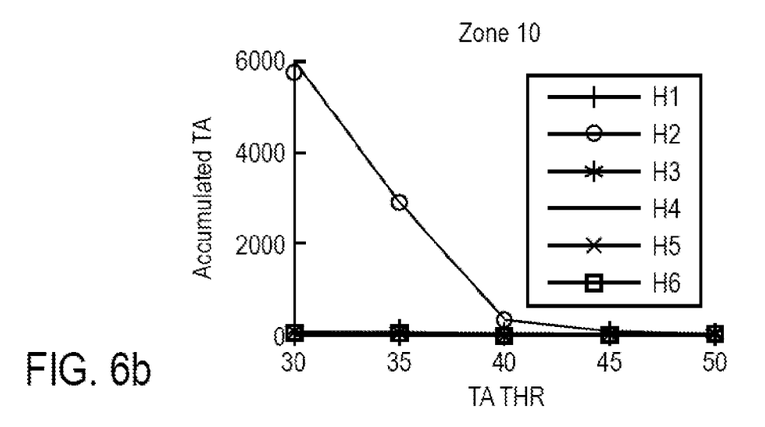
FIG. 6b depicts a graph of zone 10 indicating the accumulated events detected with six different read/write heads in some embodiments.
Figure 6C:
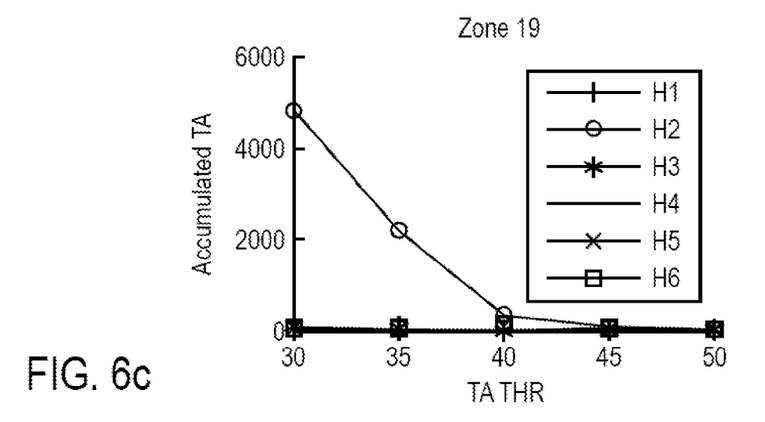
FIG. 6c depicts a graph of zone 19 indicating the accumulated events detected with six different read/write heads in some embodiments.

FIG. 6a depicts a graph of zone 1 indicating the accumulated events detected with six different read/write heads in some embodiments. Graphs 6b and 6c further depict accumulated events detected with the six different read/write heads in different zones or areas of the storage media. Head #2 consistently shows high BLP count at various stroke lengths as compare to the rest of the good heads.

In one example, the vertical axis indicates a number of events detected (e.g., aggregate indicator) over a number of waveform subsections. The horizontal axis indicates the predetermined threshold value. In this example, the graph indicates that there are 4,000 different waveform subsections, generated by read/write head #2, that were identified as being evidence of a malfunctioning head when the predetermined threshold is 30.

As the predetermined threshold increases (i.e., as the horizontal axis increases to the right of the graph), the number of subsections with signal quality values that exceed the predetermined threshold decrease. As such, when the predetermined threshold is 35, the graph indicates that the number of subsections with signal quality values that exceeds the threshold decreases to approximately 500 (e.g., the aggregate indicator, which may represent an accumulation of event indicators, may be a value of 500).

As the predetermined threshold increases, the number of identified events decreases such that when the predetermined threshold is 40 or 45, the number of identified events is approximately 200 and 50, respectively.

Those skilled in the art will appreciate that the varying the window size and/or the predetermined threshold may change the number of false positives (i.e., indicate that a read/write head is faulty when the read/write head is satisfactory) or change a number of false negatives (i.e., indicate that a read/write head is dependable when performance is unsatisfactory).

FIG. 6b depicts a graph of zone 10 indicating the accumulated events detected with six different read/write heads in some embodiments. In various embodiments, the data read by the tested read/write heads is from zone 10 and/or adjacent zones of the storage media. In this graph, read/write head #2, again, consistently shows high BLP count at various stroke lengths as compare to the rest of the good heads.

In this example, the graph indicates, for zone 10, that there are 6,000 different waveform subsections, generated by read/write head #2, that were identified as being evidence of a malfunctioning head when the predetermined threshold is 30.

As discussed, as the predetermined threshold increases (i.e., as the horizontal axis increases to the right of the graph), the number of subsections with signal quality values that exceed the predetermined threshold decrease. As such, when the predetermined threshold is 35, the graph indicates that the number of subsections with signal quality values that exceeds the threshold decreases to approximately 3000. As the predetermined threshold increases, the number of identified events decreases such that when the predetermined threshold is 40 or 45, the number of identified events is approximately 300 and 75, respectively.

FIG. 6c depicts a graph of zone 19 indicating the accumulated events detected with six different read/write heads in some embodiments. In various embodiments, the data read by the tested read/write heads is from zone 19 and/or adjacent zones of the storage media. In this graph, read/write head #2, again, shows high BLP count at various stroke lengths as compare to the rest of the good heads.

In this example, the graph indicates, for zone 19, that there are 5,000 different waveform subsections, generated by read/write head #2, that were identified as being evidence of a malfunctioning head when the predetermined threshold is 30. When the predetermined threshold is 35, the graph indicates that the number of subsections with signal quality values that exceeds the threshold decreases to approximately 2,100. As the predetermined threshold increases, the number of identified events decreases such that when the predetermined threshold is 40 or 45, the number of identified events is approximately 210 and 60, respectively.

In various embodiments, systems and methods described herein may give a clear indication when a bad head element is used in a storage device. The setup may be relatively simple and may not require additional hardware.

Those skilled in the art will appreciate that consistency may be used as an important arbitrator in determining an insufficiently performing read/write head (e.g., a malfunctioning or otherwise instable read/write head). Systems and methods described herein may help to reduce or minimize drive BER inconsistency due to bad incoming heads. In addition, when a BLP head is detected, system and methods described herein may provide clear information in decision making base on the accumulated BLPs count. A higher accumulated BLP count may translate to a more severe BLP head. Based on the count, a determination can be made to reduce the density stress of the drive or totally bypass the read/write head. The effect of systems and methods described herein may result in higher utilization of incoming read/write head, without failing the whole drive due to poor performance on one bad read/write head, and also improved read/write head reliability.

Figure 7:
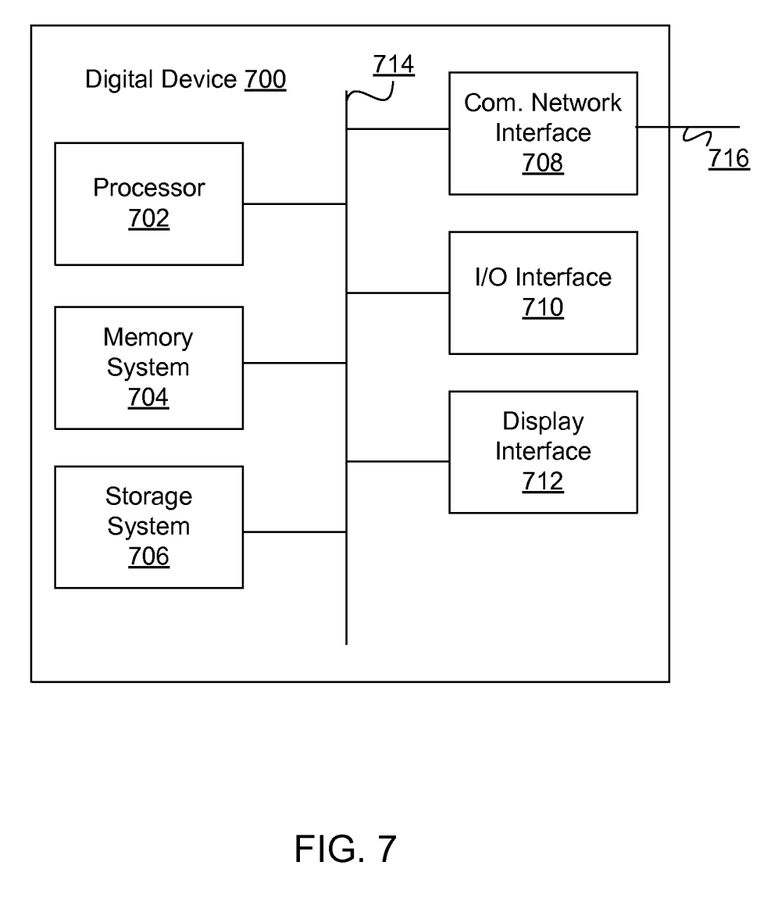
FIG. 7 is a block diagram of an exemplary digital device.

FIG. 7 is a block diagram of an exemplary digital device 700. The digital device 700 comprises a processor 702, a memory system 704, a storage system 706, a communication network interface 708, an I/O interface 710, and a display interface 712 communicatively coupled to a bus 714. The processor 702 is configured to execute executable instructions (e.g., programs). In some embodiments, the processor 702 comprises circuitry or any processor capable of processing the executable instructions. In one embodiment, the processor 702 is configured to implement some or all of the modules depicted in FIG. 4.

In various embodiments, the exemplary digital device 700 may be any device with a processor and memory configured to screen one or more read/write heads. In some embodiments, the digital device 700 is a device connected to a storage device such as a hard disk drive for the purpose of testing one or more read/write heads on the hard disk drive. In one example, the storage system 706, the communication network interface 708, the I/O interface 710, and the display interface 712 are optional.

The memory system 704 is any memory configured to store data. Some examples of the memory system 704 are storage devices, such as RAM or ROM. The memory system 704 can comprise the ram cache. In various embodiments, data is stored within the memory system 704. The data within the memory system 704 may be cleared or ultimately transferred to the storage system 706.

The storage system 706 is any non-transitory storage configured to retrieve and store data. Some examples of the storage system 706 are flash drives, hard drives, optical drives, and/or magnetic tape. In some embodiments, the digital device 700 includes a memory system 704 in the form of RAM and a storage system 706 in the form of flash data. Both the memory system 704 and the storage system 706 comprise a computer readable medium which may store instructions or programs that are executable by a computer processor including the processor 702.

The communication network interface (com. network interface) 708 can be coupled to a network (e.g., communication network 110) via the link 716. The communication network interface 708 may support communication over an Ethernet connection, a serial connection, a parallel connection, or an ATA connection, for example. The communication network interface 708 may also support wireless communication (e.g., 702.11 abg or n, WiMax, or LTE). It will be apparent to those skilled in the art that the communication network interface 708 can support many wired and wireless standards.

The optional input/output (I/O) interface 710 is any device that receives input from the user and output data. The optional display interface 712 is any device that is configured to output graphics and data to a display. In one example, the display interface 712 is a graphics adapter. It will be appreciated that not all digital devices 700 comprise either the I/O interface 710 or the display interface 712.

It will be appreciated by those skilled in the art that the hardware elements of the digital device 700 are not limited to those depicted in FIG. 7. A digital device 700 may comprise more or less hardware elements than those depicted. Further, hardware elements may share functionality and still be within various embodiments described herein. In one example, encoding and/or decoding may be performed by the processor 702 and/or a co-processor located on a GPU (e.g., Nvidia GPU).

The above-described functions and components can be comprised of instructions that are stored on a storage medium such as a computer readable medium. The computer readable medium may be non-transitory. The instructions can be retrieved and executed by a processor (e.g., processor 702). Some examples of instructions are software, program code, and firmware. Some examples of storage medium are memory devices, tape, disks, integrated circuits, and servers. The instructions are operational when executed by the processor to direct the processor to operate in accordance with some embodiments. Those skilled in the art are familiar with instructions, processor(s), and storage medium.

Various embodiments are described herein as examples. It will be apparent to those skilled in the art that various modifications may be made and other embodiments can be used without departing from the broader scope of the present disclosure. Therefore, these and other variations upon the exemplary embodiments are intended to be covered by the present disclosure.

The invention claimed is:

1. A system comprising:
a memory,
a processor, coupled with the memory, the processor configured to implement:
a filter module configured to generate a test waveform based on data read from a medium by a storage device head to be tested;
a detector module configured to:
generate a signal quality value based on a property of at least a portion of the test waveform,
compare the signal quality value to an event threshold, and
generate an event indicator based on the comparison, the event indicator indicating possible instability of the storage device head; and
an accumulator module configured to aggregate the event indicator with other event indicators to generate an aggregate indicator.

2. The system of claim 1, wherein the accumulator module is further configured to compare the aggregate indicator to an instability threshold.

3. The system of claim 2, wherein the processor is further to implement a notification module configured to provide a notification regarding instability of the storage device head based on the comparison of the aggregate indicator to the instability threshold.

4. The system of claim 2, wherein the processor is further configured to change a bias voltage across the storage device head based on the comparison of the aggregate indicator to the instability threshold.

5. The system of claim 1, wherein the detector module is further configured to generate the signal quality value based on the property of the at least the portion of the test waveform by averaging over time the property of the at least the portion of the test waveform.

6. The system of claim 1, wherein the property of the at least the portion of the test waveform comprises amplitude.

7. The system of claim 1, the data comprises a predetermined pattern of the data written on the medium.

8. The system of claim 7, wherein the predetermined pattern comprises data written to the medium at a 2T frequency.

9. The system of claim 1, wherein the detector module is further configured to detect changes of consistency within the at least the portion of the test waveform.

10. The system of claim 1, further comprising a storage device controller configured to stress the storage device head to be tested during writing of a predetermined pattern to the medium or to stress the storage device head to be tested during a read-back of the data from the medium.

11. A method comprising:
reading, by a storage device head to be tested, data from a medium;
generating a test waveform based on the data read from the medium;
determining a signal quality value based on a property of at least a portion of the test waveform;
comparing the signal quality value to an event threshold;
generating an event indicator based on the comparison, the event indicator indicating possible instability of the storage device head; and
aggregating the event indicator with other event indicators to generate an aggregate indicator.

12. The method of claim 11, further comprising comparing the aggregate indicator to an instability threshold.

13. The method of claim 12, further comprising providing a notification regarding instability of the storage device head based on the comparison of the aggregate indicator to the instability threshold.

14. The method of claim 12, further comprising changing a bias voltage across the storage device head based on the comparison of the aggregate indicator to the instability threshold.

15. The method of claim 11, wherein generating the signal quality value based on the property of the at least the portion of the test waveform comprises averaging over time the property of the at least the portion of the test waveform.

16. The method of claim 11, wherein determining the signal quality value is based on the property of the at least the portion of the test waveform averaging comprises averaging amplitudes of one or more sections of the test waveform.

17. The method of claim 11, wherein the data comprises a predetermined pattern written to the medium.

18. The method of claim 17, wherein the predetermined pattern comprises the data written to the medium at a 2T frequency.

19. The method of claim 11, further comprising receiving a predetermined window threshold and identifying the test waveform as a subsection of a larger waveform associated with the data read from the medium based on the predetermined window threshold.

20. The method of claim 11, wherein comparing the signal quality value to the event threshold comprises detecting changes of consistency within the at least the portion of the test waveform.

21. The method of claim 11, further comprising stressing the storage device head at the time of or before reading the data from the medium.

22. A system comprising:
a storage device head to be tested configured to read data from a medium;
a means for generating a test waveform based on the data read from the medium;
a means for generating a signal quality value based on a property of at least a portion of the test waveform;
a means for comparing the signal quality value to an event threshold;
a means for generating an event indicator based on the comparison, the event indicator indicating possible instability of the storage device head;
a means for storing the event indicator, and
a means for aggregating the event indicator with other event indicators to generate an aggregate indicator.

23. A system comprising:
a memory,
a processor, coupled with the memory, the processor configured to implement:
a filter module configured to generate a test waveform based on data read from a medium by a storage device head to be tested;
a detector module configured to:
generate a signal quality value based on a property of at least a portion of the test waveform by averaging over time the property of the at least the portion of the test waveform,
compare the signal quality value to an event threshold,
generate an event indicator based on the comparison, the event indicator indicating possible instability of the storage device head, and
generate the signal quality value based on the property of the at least the portion of the test waveform by averaging over time the property of the at least the portion of the test waveform.

24. The system of claim 23, wherein the processor is further to implement an accumulator module configured to aggregate the event indicator with other event indicators to generate an aggregate indicator.

25. The system of claim 24, wherein the accumulator module is further configured to compare the aggregate indicator to an instability threshold.

26. The system of claim 25, wherein the processor is further to implement a notification module configured to provide a notification regarding instability of the storage device head based on the comparison of the aggregate indicator to the instability threshold.

27. The system of claim 25, wherein the processor is further configured to change a bias voltage across the storage device head based on the comparison of the aggregate indicator to the instability threshold.

28. A method comprising:
reading, by a storage device head to be tested, data from a medium;
generating a test waveform based on the data read from the medium;
determining a signal quality value based on a property of at least a portion of the test waveform by at least averaging over time the property of the at least the portion of the test waveform;
comparing the signal quality value to an event threshold; and
generating an event indicator based on the comparison, the event indicator indicating possible instability of the storage device head.

29. The method of claim 28, further comprising aggregating the event indicator with other event indicators to generate an aggregate indicator.

30. The method of claim 29, further comprising comparing the aggregate indicator to an instability threshold.

31. The method of claim 30, further comprising providing a notification regarding instability of the storage device head based on the comparison of the aggregate indicator to the instability threshold.

32. The method of claim 30, further comprising changing a bias voltage across the storage device head based on the comparison of the aggregate indicator to the instability threshold.

33. A system comprising:
a memory,
a processor, coupled with the memory, the processor configured to implement:
a filter module configured to receive a predetermined window threshold and identify a test waveform as a subsection of a larger waveform associated with data read from a medium by a storage device head to be tested based on the predetermined window threshold; and
a detector module configured to:
generate a signal quality value based on a property of at least a portion of the test waveform,
compare the signal quality value to an event threshold, and
generate an event indicator based on the comparison, the event indicator indicating possible instability of the storage device head.

34. The system of claim 33, wherein the processor is further to implement an accumulator module configured to aggregate the event indicator with other event indicators to generate an aggregate indicator.

35. The system of claim 34, wherein the accumulator module is further configured to compare the aggregate indicator to an instability threshold.

36. The system of claim 35, wherein the processor is further to implement a notification module configured to provide a notification regarding instability of the storage device head based on the comparison of the aggregate indicator to the instability threshold.

37. The system of claim 35, wherein the processor is further configured to change a bias voltage across the storage device head based on the comparison of the aggregate indicator to the instability threshold.

38. The system of claim 33, wherein the detector module is further configured to generate the signal quality value based on the property of the at least the portion of the test waveform by averaging over time the property of the at least the portion of the test waveform.

39. A method comprising:
reading, by a storage device head to be tested, data from a medium;
receiving a predetermined window threshold and identifying a test waveform as a subsection of a larger waveform associated with the data read from the medium based on the predetermined window threshold;
determining a signal quality value based on a property of at least a portion of the test waveform;
comparing the signal quality value to an event threshold; and
generating an event indicator based on the comparison, the event indicator indicating possible instability of the storage device head.

40. The method of claim 39, further comprising aggregating the event indicator with other event indicators to generate an aggregate indicator.

41. The method of claim 40, further comprising comparing the aggregate indicator to an instability threshold.

42. The method of claim 41, further comprising providing a notification regarding instability of the storage device head based on the comparison of the aggregate indicator to the instability threshold.

43. The method of claim 41, further comprising changing a bias voltage across the storage device head based on the comparison of the aggregate indicator to the instability threshold.

44. The method of claim 39, wherein generating the signal quality value based on the property of the at least the portion of the test waveform comprises averaging over time the property of the at least the portion of the test waveform.

* * * * *